United States Patent
Yang et al.

(10) Patent No.: US 11,839,935 B2
(45) Date of Patent: Dec. 12, 2023

(54) METHOD AND SYSTEM FOR WELD DEFECT DETECTION

(71) Applicant: GM GLOBAL TECHNOLOGY OPERATIONS LLC, Detroit, MI (US)

(72) Inventors: Baixuan Yang, Troy, MI (US); Wei Zeng, Oakland Township, MI (US); Hui-ping Wang, Troy, MI (US); Joshua Lee Solomon, Berkley, MI (US); Scott E Parrish, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 17/456,992

(22) Filed: Nov. 30, 2021

(65) Prior Publication Data

US 2023/0166361 A1    Jun. 1, 2023

(51) Int. Cl.
*B23K 31/00* (2006.01)
*B23K 31/12* (2006.01)
(Continued)

(52) U.S. Cl.
CPC .......... *B23K 31/125* (2013.01); *B23K 26/034* (2013.01); *B23K 26/21* (2015.10); *B23K 2101/006* (2018.08)

(58) Field of Classification Search
CPC .... B23K 31/125; B23K 26/034; B23K 26/21; B23K 2101/006
(Continued)

(56) References Cited

U.S. PATENT DOCUMENTS

| | | | | |
|---|---|---|---|---|
| 3,191,441 A | * | 6/1965 | Erickson | B23K 11/248 |
| | | | | 228/103 |
| 6,188,041 B1 | * | 2/2001 | Kim | B23K 26/034 |
| | | | | 219/121.72 |

(Continued)

FOREIGN PATENT DOCUMENTS

| | | | | | |
|---|---|---|---|---|---|
| CN | 109108518 A | * | 1/2019 | | |
| CN | 109500494 A | * | 3/2019 | | B23K 26/21 |

(Continued)

*Primary Examiner* — Kiley S Stoner
(74) *Attorney, Agent, or Firm* — Lorenz & Kopf LLP

(57) ABSTRACT

Methods and systems for detecting weld defects, and methods for manufacturing vehicles using such methods or systems, are provided. An exemplary method includes receiving an input indicating a weld material and material thickness by a portable computing device and determining, with the portable computing device, a detection protocol for the weld material and material thickness. Further, the method includes communicating the detection protocol from the portable computing device to a portable heating source and to a portable thermographic sensor, heating a weld with the portable heating source according to the detection protocol, and recording thermographic data from the weld with the portable thermographic sensor according to the detection protocol. Also, the method includes communicating the thermographic data from the portable thermographic sensor to the portable computing device, and analyzing the thermographic data to detect whether the weld includes a defect and/or determine type, dimension and location of the defect.

18 Claims, 5 Drawing Sheets

(51) Int. Cl.
*B23K 26/03* (2006.01)
*B23K 26/21* (2014.01)
*B23K 101/00* (2006.01)

(58) Field of Classification Search
USPC .......................................... 228/8–9, 102–105
See application file for complete search history.

(56) References Cited

U.S. PATENT DOCUMENTS

2010/0314362 A1* 12/2010 Albrecht ................ B23K 37/00
  219/121.63
2021/0318673 A1* 10/2021 Kitchen ............... B23K 31/006

FOREIGN PATENT DOCUMENTS

| CN | 110695562 A | * | 1/2020 | |
|---|---|---|---|---|
| CN | 111015006 A | * | 4/2020 | ........... B23K 26/348 |
| CN | 111822855 A | * | 10/2020 | ............. B23K 26/21 |
| DE | 102008062866 A1 | * | 5/2010 | ........... B23K 1/0056 |
| KR | 101997198 B1 | * | 10/2019 | |
| KR | 102114359 B1 | * | 5/2020 | |
| KR | 102134720 B1 | * | 7/2020 | |
| KR | 20200136686 A | * | 12/2020 | |
| WO | WO-2013085075 A1 | * | 6/2013 | ............. B23K 20/12 |
| WO | WO-2021107407 A1 | * | 6/2021 | ........... B23K 31/125 |
| WO | WO-2021152344 A1 | * | 8/2021 | ........... B23K 31/125 |

* cited by examiner

METHOD AND SYSTEM FOR WELD DEFECT DETECTION

INTRODUCTION

The technical field generally relates to the detection of defects in welded parts and, more particularly, to methods and systems for detecting defects that may occur in welded parts, such as floor pans and other parts, during the manufacture of vehicles such as automobiles.

Welding is a process that is ubiquitous in various industries and applications. A variety of welding techniques have been developed that seek to provide fast welding capabilities with adequate penetration and gap bridgeability such as remote laser beam welding process. While the remote laser beam welding moves the laser beam using Galvo-mirrors and provides fast welding speed and deep penetration benefits, such a welding process typically requires tight joint fit up for the laser beam to adequately bridge the gap between the workpieces since no filler material is added in the process. Conventional laser beam welding processes, on the other hand, typically move the laser beam via movement of entire welding optics by robot arm or other carriers, allow use of filler wire and provide for welding more slowly than the remote laser-beam processes. They are capable of bridging much larger gaps than the remote laser-beams.

While conventional laser welding processes provide good bridgeability, such processes are often associated with drawbacks. For example, a large clearance in the joint area is required since the welding optics sit either on top of the joint or at close distance of millimeter scale above the joint top surface. These drawbacks often reduce or eliminate the applicability of conventional laser beam welding to a variety of applications where clearance is not available. Remote laser beam welding, on the other hand, welds from several hundreds of millimeters high above the joint surface, and can be applicable to any joints visible to the laser beam. The size of laser beam can be as small as several micrometers to as large as several millimeters depending on the application needs.

Regardless of the welding process, it is vital to ensure that proper welds are formed, i.e., welds without weld defects. Defects such as missed welds, holes, skips, pores are visible to common topical optic detection methods. Defects known as "false friends" occur when two joining partners overlap each other in an overlap area and are welded to one another in the overlap area, and the weld seam looks optically okay from an upper side, although there is actually no connection existing between the joining partners. This can be due to incomplete penetration or due to a large gap between the joining partners. Such defects cannot be detected by two-dimensional optic review.

Accordingly, it is desirable to provide methods and systems for detecting both visible and subsurface weld defects in time. In addition, it is desirable to provide methods and systems for welding components in a welding station and for detecting weld defects in the welding station without removing the welded assembly therefrom. Furthermore, other desirable features and characteristics of embodiments will become apparent from the subsequent detailed description and the appended claims, taken in conjunction with the accompanying drawings and the foregoing technical field and background.

SUMMARY

Methods and systems for detecting weld defects and methods for manufacturing vehicles while utilizing weld defect detection are provided. An exemplary method includes receiving an input indicating a weld material and material thickness by a portable computing device and determining, with the portable computing device, a detection protocol for the weld material and material thickness. Further, the method includes communicating the detection protocol from the portable computing device to a portable heating source and to a portable thermographic sensor, heating a weld with the portable heating source according to the detection protocol, and recording thermographic data from the weld with the portable thermographic sensor according to the detection protocol. Also, the method includes communicating the thermographic data from the portable thermographic sensor to the portable computing device, and analyzing the thermographic data to detect whether the weld includes a defect, and/or report type, dimension and location of the defect.

In certain embodiments of the method, the portable computing device analyzes the thermographic data to detect whether the weld includes a defect, and/or report type, dimension and location of the defect. In certain embodiments, the portable computing device includes a memory that stores a library of reference thermographic data, and the portable computing device compares the thermographic data with the reference thermographic data when analyzing the thermographic data to detect whether the weld includes a defect, and/or report type, dimension and location of the defect. In certain embodiments, the portable thermographic sensor is an infrared (IR) sensor, wherein the thermographic data includes an IR image or IR images or temperature and/or image intensity information obtained from the IR image or images, wherein the library of reference thermographic data comprises a library of reference IR images or temperature and/or image intensity information obtained from the IR image or images, and wherein each IR image is a temperature distribution image directly received from the IR sensor or is an amplified image using lock-in digital amplification.

In certain embodiments of the method, analyzing the thermographic data to detect whether the weld includes a defect and/or determine type, dimension and location of the defect includes performing thermal contour correlation or cooling rate correlation.

In certain embodiments of the method, analyzing the thermographic data to detect whether the weld includes a defect and/or determine type, dimension and location of the defect comprises performing digital magnification and denoising.

In certain embodiments of the method, the portable heating source is an infrared (IR) light source or a heat gun.

In certain embodiments of the method, the detection protocol includes a time duration for heating the weld with the portable heating source.

In certain embodiments of the method, the detection protocol includes a heating position for heating the weld with the portable heating source and a recording position for recording the thermographic data from the weld with the portable thermographic sensor. In certain embodiments, the method further includes receiving an input indicating the heating position and the recording position with the portable computing device.

In certain embodiments of the method, a probe includes the portable heating source and the portable thermographic sensor.

In certain embodiments, the method further includes monitoring a distance to the weld from the portable heating source and the portable thermographic sensor with the portable computing device to determine whether a distance adjustment is needed, and, when the distance adjustment is needed, communicating an instruction to adjust the distance.

In certain embodiments, the method further includes instructing the portable heating source with the portable computing device to heat the weld according to the detection protocol, and instructing the portable thermographic sensor with the portable computing device to record the thermographic data from the weld according to the detection protocol.

In certain embodiments, the method includes displaying, on the portable computing device, the weld material and material thickness, the detection protocol, the thermographic data, and/or an indication of whether the weld includes a defect and/or type, dimension and location of the defect.

In certain embodiments, the method further includes locating two metallic components in a welding station; welding the two metallic components to one another to form an assembly connected with a weld; locating the portable computing device; the portable heating source and the portable thermographic sensor in the welding station, wherein heating the weld with the portable heating source, recording the thermographic data from the weld, and communicating the thermographic data are performed in the welding station; and when the weld includes a weld defect, performing an additional welding process to eliminate or repair the weld defect according to type, dimension and location of the defect. In certain embodiments, the method includes, when the weld includes no weld defect, removing the assembly from the welding station.

In another exemplary embodiment, a method for manufacturing a vehicle is provided. The method includes locating two metallic components in a welding station and welding the two metallic components to one another to form an assembly connected with a weld. Further, the method includes locating a portable weld-defect detector in the welding station, and testing the weld with the detector to detect whether the weld includes a weld defect and/or determine type, dimension and location of the defect. When the weld includes a weld defect, the method includes performing an additional welding process to eliminate or repair the weld defect according to type, dimension and location of the defect. When the weld includes no weld defect, the method includes removing the assembly from the welding station.

In certain embodiments of the method, testing the weld includes heating the weld and capturing an infrared (IR) image or images of the weld and processing and analyzing the thermographic image or images to detect whether the weld includes a weld defect and/or determine type, dimension and location of the defect.

In another exemplary embodiment, a system for detecting a defect in a weld is provided. The system includes a portable heating source, a portable thermographic sensor, and a portable computing device in communication with the heating source and the thermographic sensor. The portable computing device is configured to execute an application in response to receiving an input, and the application includes computer-executable instructions that, when executed by the portable computing device, are configured to: determine a detection protocol for the weld material and material thickness; communicate the detection protocol to a portable heating source and to a portable thermographic sensor; receive thermographic data from the portable thermographic sensor; and analyze the thermographic data to detect whether the weld includes a defect and/or determine type, dimension and location of the defect. Further, the portable heating source is configured to heat the weld according to the detection protocol, and the portable thermographic sensor is configured to record the thermographic data from the weld according to the detection protocol.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
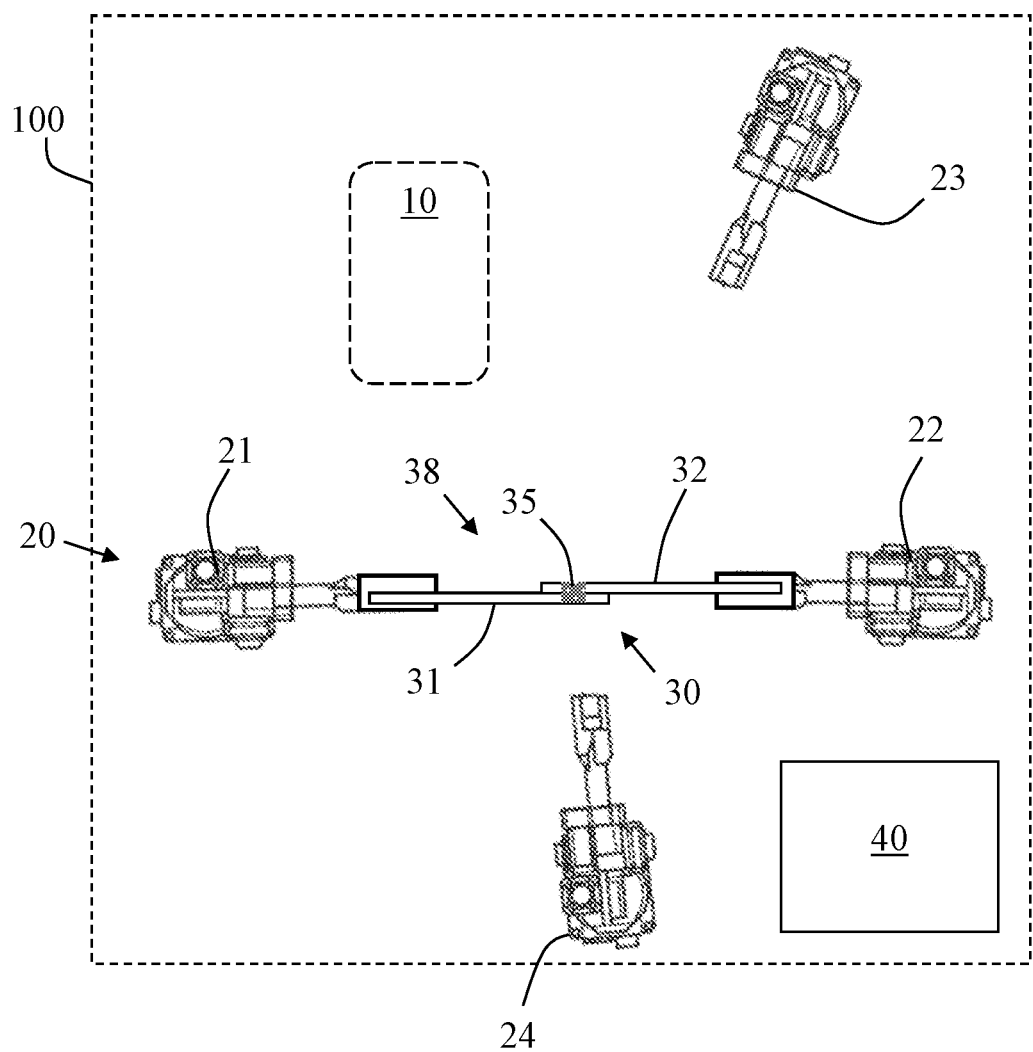
FIG. 1 is a schematic illustration of a welding station for welding together two metallic components in an automotive vehicle manufacturing process, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising", but in certain embodiments may mean "consisting of". In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

It should also be understood that, depending on the example, certain acts or events of any of the processes or methods described herein may be performed in a different sequence, may be added, merged, or left out altogether (e.g., all described acts or events may not be necessary to carry out the techniques).

In addition, while certain aspects of this disclosure are described as being performed by a single module or unit for purposes of clarity, it should be understood that the techniques of this disclosure may be performed by a combination of units or modules. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be configurable to be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

"Node/Port"—As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node). As used herein, a "port" means a node that is externally accessible via, for example, a physical connector, an input or output pin, a test probe, a bonding pad, or the like.

"Connected/Coupled"—The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although schematics may depict one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Embodiments herein are related to the testing of welded components, such as metallic parts, and more specifically to the testing of welded automotive vehicle structural parts. Such testing is performed to detect not only visible defects but also subsurface defects, i.e., defects that cannot be detected by two-dimensional optic analysis. Further, such testing is performed without damaging or destroying the tested components. Certain embodiments are focused on the detection of 'false-friends' weld defects.

Exemplary embodiments provide for onsite weld quality inspection, and enable onsite re-welding. Specifically, exemplary embodiments include a portable weld defect testing system that may be carried into the welding station to test a welded component. As a result, a welded component need not be moved from the welding station for testing, and re-welding may be performed, if needed, without moving the welded component and going through processing to ensure that the welded component is correctly positioned with respect to the welding robot.

FIG. 1 is a basic diagram of a welding station 100 where metallic components are welded together, such as during manufacture of a vehicle. As shown, a weld defect detection system 10 is located within the welding station 100 where welding is performed. The exemplary system 10 is portable. For example, the system 10 may be lightweight and carried into and out of neighboring welding stations 100 in a manufacturing facility. In exemplary embodiments, the system 10 is handheld.

Also located in the welding station 100 are robots 20, such as grasping robots 21 and 22, optic robot 23, and welding robot 24. Other arrangements of robots 20 are contemplated. Robots 20 are provided to grasp, maneuver, and weld metallic components 30, including component 31 and component 32. For example, as illustrated, robot 21 is grasping metallic component 31 and robot 22 is grasping metallic component 32 such that the components 31 and 32 are held together in a desired orientation for welding. As further illustrated, welding robot 24 has performed a welding operation to form a weld 35 connecting components 31 and 32, thus forming a joined component or assembly 38.

As shown, the welding station 100 also includes a controller module 40 in communication with robots 20. Alternatively, the controller module 40 may be located outside of the welding station 100. The exemplary controller module 40 provides directions or instructions for each of the robots 20. Such instructions may be based on information received by the controller module 40 from the optic robot 23. Generally, the controller module 40 may be a facility or plant-level controller having responsibility for a facility or area within the facility, which facilitates development and assignment of material handling tasks and assembly tasks.

It is noted that metallic components 31 and 32 may be of different material or "weld material" from one another and may have a different thickness or "material thickness" from one another.

Figure 2:
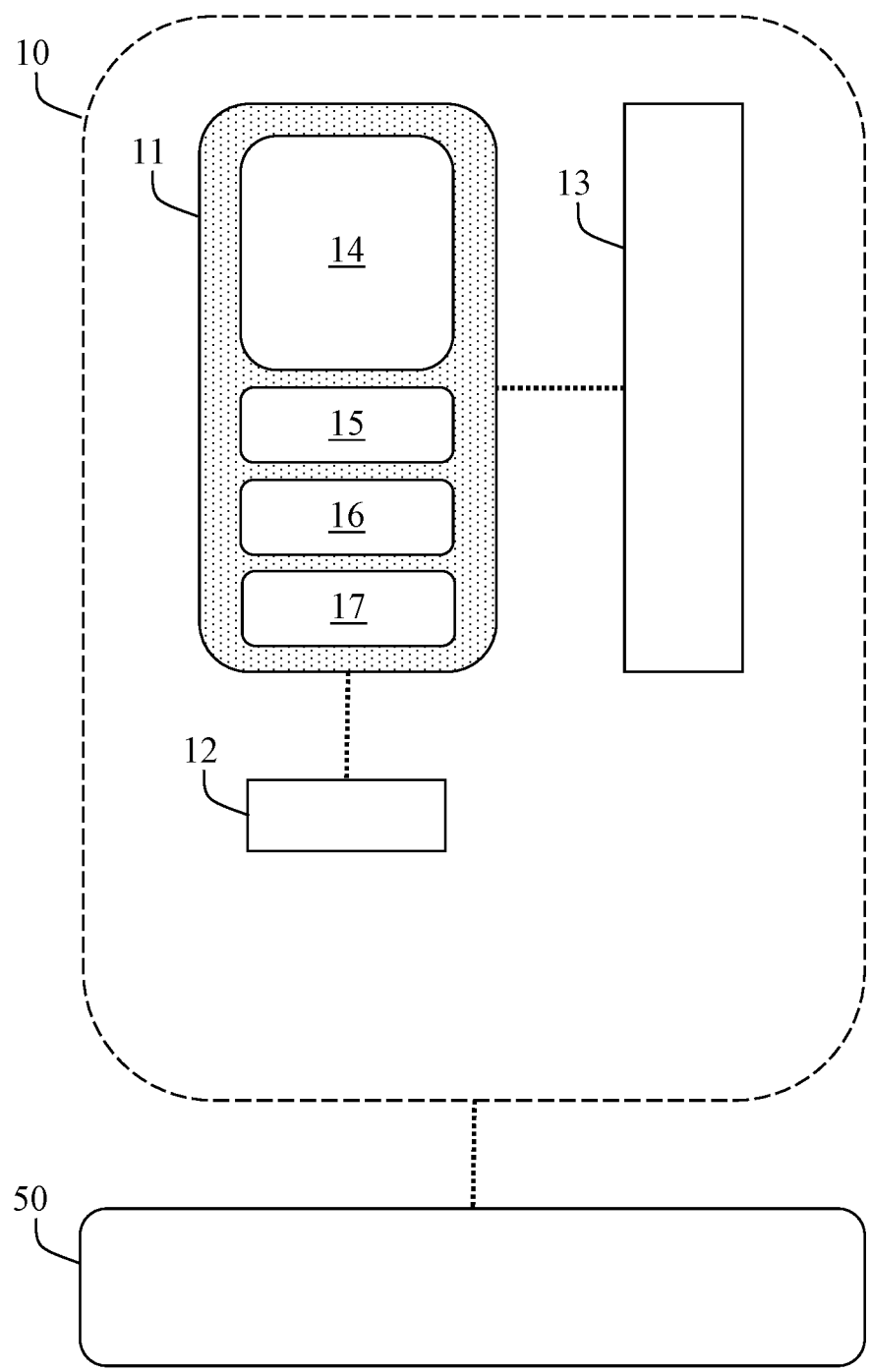
FIG. 2 is a schematic illustration of a portable system for detecting a defect in a weld such as for use in the welding station of FIG. 1, in accordance with various embodiments.

FIG. 2 is a schematic of the portable weld defect detection system 10 of FIG. 1. As shown, the system 10 includes a portable computing device 11, a portable sensor 12, and a portable heating source 13. The portable computing device 11 is in communication with the portable heating source and the portable sensor. As shown, the portable system 10 may be selectively connected or in communication with an external device 50 for data visualization, analysis, or storage, such as by a wired or wireless connection.

An exemplary portable computing device 11 is a cellular or mobile phone. As shown, the portable computing device 11 includes a display screen 14 for displaying data or results. Further, the portable computing device 11 includes an input 15 for receiving inputs or instructions from a user. Also, the portable computing device 11 includes a software application 16 for performing a weld defect detection process. As shown, the portable computing device 11 includes a memory 17 for storing data or images. In an exemplary embodiment, the system 10 performs a detection method by running a user-friendly software application ("app") 16 saved on the portable computing device 11 by inputting commands or data through input 15. The portable computing device 11 may perform as a display, control, and analysis unit.

An exemplary portable sensor 12 is configured to record thermographic data from the weld according to a detection protocol. An exemplary portable sensor 12 is a thermographic sensor, such as an infrared (IR) sensor. In exemplary embodiments, the portable sensor 12 is connected to the portable computing device 11. While illustrated as a component external of the portable computing device 11, in certain embodiments, the portable sensor 12 is included as an internal component of the portable computing device 11 or is mounted directly on the portable computing device 11. Whether internal or external, the portable sensor 12 is in electronic communication with portable computing device 11. For example, the portable sensor 12 may be physically connected to the portable computing device 11 by a wire or the portable sensor 12 may be connected to the portable computing device 11 wirelessly, such as via local area networking like Wi-Fi™ or via a low-power, short-range radio connectivity such as Bluetooth®.

An exemplary portable heating source 13 is configured to heat a weld according to a detection protocol. An exemplary portable heating source 13 is an infrared (IR) lighting or heat gun. In exemplary embodiments, the portable heating source 13 is connected to the portable computing device 11. The portable heating source 13 may be physically mounted to the portable computing device 11. In other embodiments, the portable heating source 13 may be connected to the portable computing device 11 wirelessly, such as local area networking like Wi-Fi™ or low-power, short-range radio connectivity like Bluetooth®. In exemplary embodiments, the portable heating source 13 includes a light control unit through which the portable computing device 11 is connected and communicates.

In exemplary embodiments, the portable sensor 12 is configured to capture a heat map image of the weld surface and to communicate the image and/or image data to the portable computing device 11 for image processing and analysis. In an exemplary embodiment, the portable computing device 11 performs image processing and analysis to detect a weld defect or defects by performing either thermal contour correlation or cooling rate correlation. Results of the analysis are displayed on the display screen 14 of the portable computing device 11 and/or are outputted to the external device 50 for further data visualization analysis or storage.

In exemplary embodiments, the portable computing device 11 is configured to execute an application in response to receiving an input, the application including computer-executable instructions that, when executed by the portable computing device, are configured to: determine a detection protocol for a weld material and material thickness; communicate the detection protocol to a portable heating source and to a portable thermographic sensor; receive thermographic data from the portable thermographic sensor; and analyze the thermographic data to detect whether the weld includes a defect and/or determine type, dimension and location of the defect.

Figure 3:
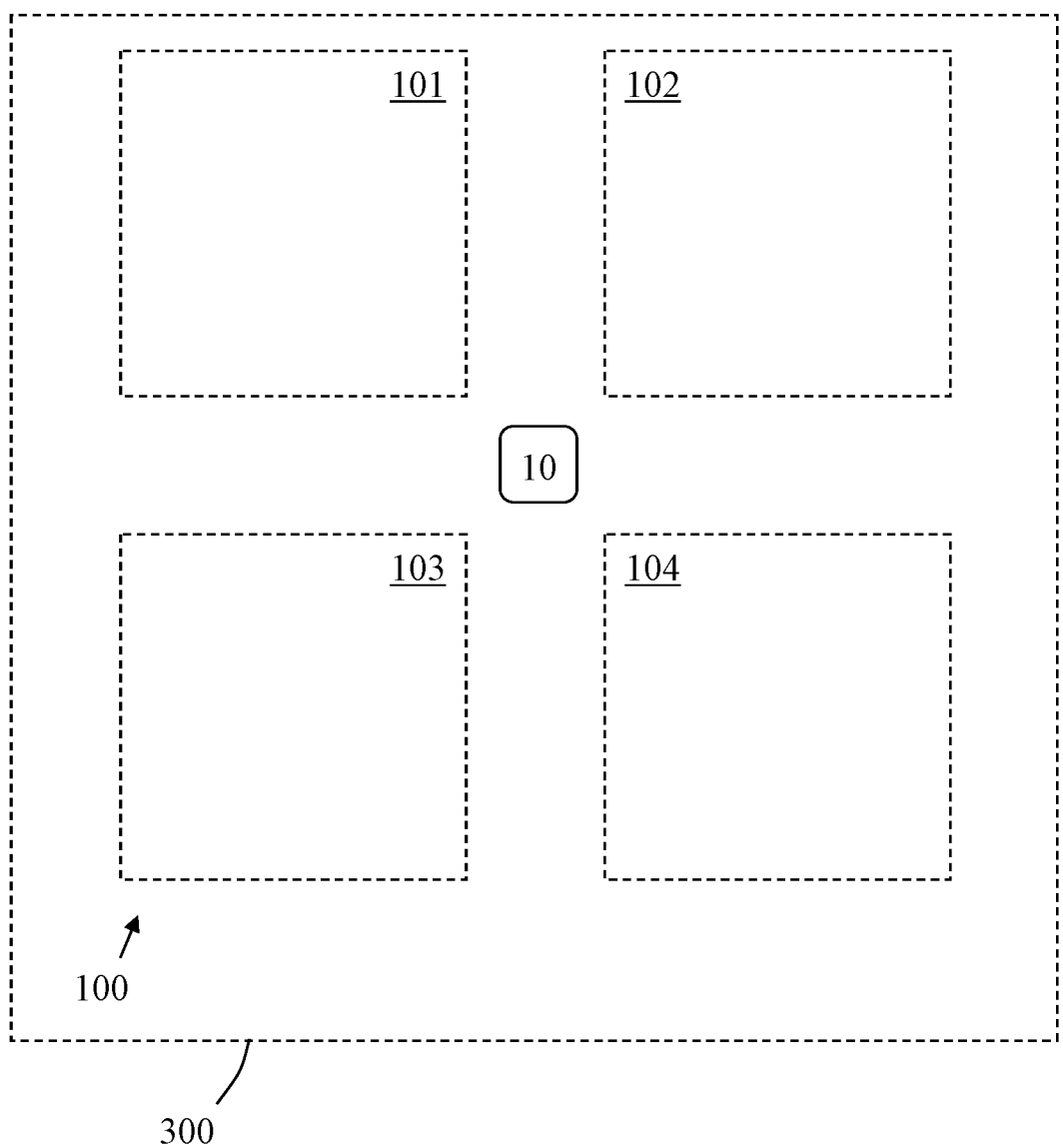
FIG. 3 is a schematic illustration of a manufacturing facility includes a plurality of welding stations for use with the portable system of FIG. 2.

Referring now to FIG. 3, a manufacturing location 300 is illustrated and includes a plurality of welding stations 100. As shown, the plurality of welding stations 100 includes station 101, station 102, station 103, and station 104. Different welding processes may be performed in each station 101-104, whether on different metallic components or as successive welding processes in a downstream direction. As shown, a single portable weld defect detection system 10 is provided to test welds formed in joined components or assemblies in welding stations 101, 102, 103, and 104. Specifically, the portable weld defect detection system 10 is carried into each welding station 101, 102, 103, and 104 to perform a weld defect detection method therein. In this manner, a joined component or assembly remains in the respective welding station 100 after being welded, and an additional corrective welding process may be performed onsite if a weld defect is detected by the portable weld defect detection system 10. As a result, the joined component or assembly is not moved from the initial welding process to the corrective welding process.

Figure 4:
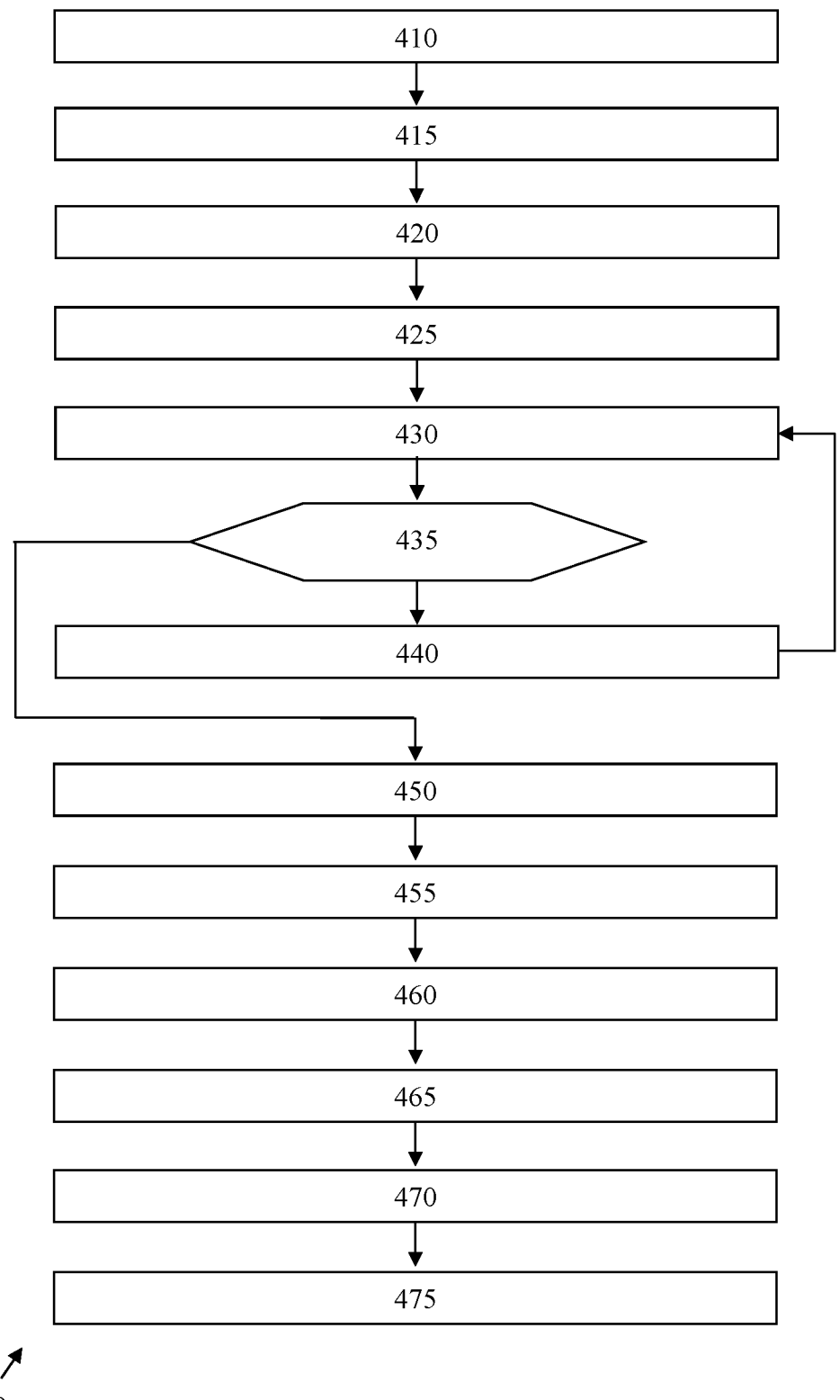
FIG. 4 is a flow chart illustration of a method for detecting a weld defect, in accordance with various embodiments.

FIG. 4 illustrates a weld defect detection method 400. The method 400 may include, at action 410, receiving an input into portable computing device 11, regarding the weld to be inspected. For example, the input may indicate a weld material and material thickness. Accordingly, a user may enter, through the input 15 on the portable computing device 11 the material of component 31 and the thickness of component 31 and the material of component 32 and the thickness of component 32. For example, each material may be a specific alloy of steel or aluminum.

Additionally, the input may include a position (or "heating position") of the portable heating source in relation to the weld bottom or weld surface when heating is performed. Also, the input may include a position (or "heating position") of the portable heating source in relation to the weld bottom or weld surface when heating is performed. Further, the input may include a position (or "recording position") of the portable sensor in relation to the weld bottom or weld surface when thermographic data from the weld is recorded.

Each position may comprise a distance from the weld bottom or from the weld surface.

The method 400 may continue at action 415 with determining, with the portable computing device 11, a detection protocol for the weld material and material thickness. For example, depending on the inputted materials and thicknesses, the heating position, and/or the recording position, the detection protocol may include a heating temperature or output and/or heating time duration for heating the weld with the portable heating source for analysis. In certain embodiments, the portable computing device 11 includes in memory 17 a library of heating temperatures/outputs and/or heating time durations that are associated with various combinations of weld materials and material thicknesses, such that determination of the detection protocol includes matching the associated heating temperature/output and/or heating time duration with the inputted combinations of weld materials and material thicknesses.

If not entered in the input, the detection protocol may also include the heating position for the portable heating source when heating the weld and/or the recording position for the portable sensor when recording thermographic data from the weld.

Also, depending on the inputs, the detection protocol may include a lock-in process with external pulsing excitation for heating to perform digital amplification. The lock-in process is a signal processing technique to improve signal/noise (S/N) ratio by measuring temperature variations in a sample to which a load is repeatedly applied. The process involves extracting only the temperature variations with cycles identical to the cycle of a sample (lock-in reference signals) from time-series data.

Method 400 may further include receiving an input from the user to begin the detection process at action 420.

Method 400 may include positioning of the portable sensor 12 and the portable heating source 13 at a predefined distance to the weld surface or weld bottom for heating at action 425. In exemplary embodiments, a probe includes the portable heating source and the portable sensor, and the distance is controlled by the probe. For example, the probe may include a fiber optic sensor or IR sensor and be used with a touch-down method to control imaging and distance repeatability. The probe can be used for both external excitation (e.g., heating via a light source) and sensing (e.g., as a sensor). In other embodiments, the distance may be controlled by a calibrated gauge stick or by a distance measurement function in the portable computing device 11.

For example, method 400 may continue, at action 430, with monitoring a distance to the weld from the portable heating source 13 and the portable sensor 12 with the portable computing device 11. At inquiry 435, method 400 queries whether a distance adjustment is needed. If a distance adjustment is needed, the portable computing device 11 communicates an instruction to adjust the distance. For example, the portable computing device 11 may display such an instruction to the user on display screen 14 and the user adjusts the location. Thereafter, method 400 may continue at action 430.

When no further distance adjustment is needed at inquiry 435, method 400 may continue with communicating the detection protocol from the portable computing device 11 to the portable sensor 12 and to the portable heating source 13, at action 450. Such communication may include an instruction to the portable heating source to heat the weld according to the detection protocol and an instruction to the portable sensor to record thermographic data from the weld according to the detection protocol.

Method 400 further includes at action 455, heating the weld with the portable heating source according to the detection protocol and, at action 460, recording thermographic data from the weld with the portable thermographic sensor according to the detection protocol. Recording thermographic data may include capturing an image, such as an infrared image.

At action 465, the thermographic data is communicated from the portable sensor to the portable computing device 11. At action 470, the thermographic data is analyzed to detect whether the weld includes a defect and/or determine type, dimension and location of the defect. In exemplary embodiments, the portable computing device 11 analyzes the thermographic data to detect whether the weld includes a defect and/or determine type, dimension and location of the defect. In certain embodiments, the portable computing device includes a memory that stores a library of reference thermographic data, and, when analyzing the thermographic data to detect whether the weld includes a defect and/or determine type, dimension and location of the defect, the portable computing device compares the thermographic data with the reference thermographic data. In exemplary embodiments, the portable thermographic sensor is an infrared (IR) sensor, the thermographic data includes an IR image or IR images, and the library of reference thermographic data includes a library of reference IR images. In exemplary embodiments, analyzing the thermographic data to detect whether the weld includes a defect and/or determine type, dimension and location of the defect includes performing thermal contour correlation or cooling rate correlation. Further, in exemplary embodiments, analyzing the thermographic data to detect whether the weld includes a defect and/or determine type, dimension and location of the defect includes performing digital magnification and de-noising.

Method 400 includes outputting an indication of whether the weld includes a defect and/or determine type, dimension and location of the defect at action 475. For example, the portable computing device 11 may display an indication of whether the weld includes a defect and/or type, dimension and location of the defect, as well as the weld material and material thickness, the detection protocol, and/or the thermographic data.

In view of method 400, generally to perform an inspection, the portable computing device sends a 'ready' signal to the portable sensor and portable heating source. The user positions the portable sensor and portable heating source at a predefined distance to the weld surface, where the distance is controlled by a probe, by a calibrated gauge stick, or by a distance measurement function in the portable computing device. The portable computing device controls the light unit of the heating source to activate heating. After sufficient heating, the portable sensor takes a heat map image and then sends the heat map image or associated data to the portable computing device. The portable computing device performs image analysis that may include signal magnification and de-noising. The method may use a lock-in method with external pulsing excitation for heating to perform digital amplification. The defect detection is performed by either thermal contour correlation or cooling rate correlation. Temperature decay may be captured by continuous excitation light source with a defined speed. Thereafter, detection results are displayed by the portable computing device and also may be outputted to an external device for further data visualization, analysis, or storage.

Figure 5:
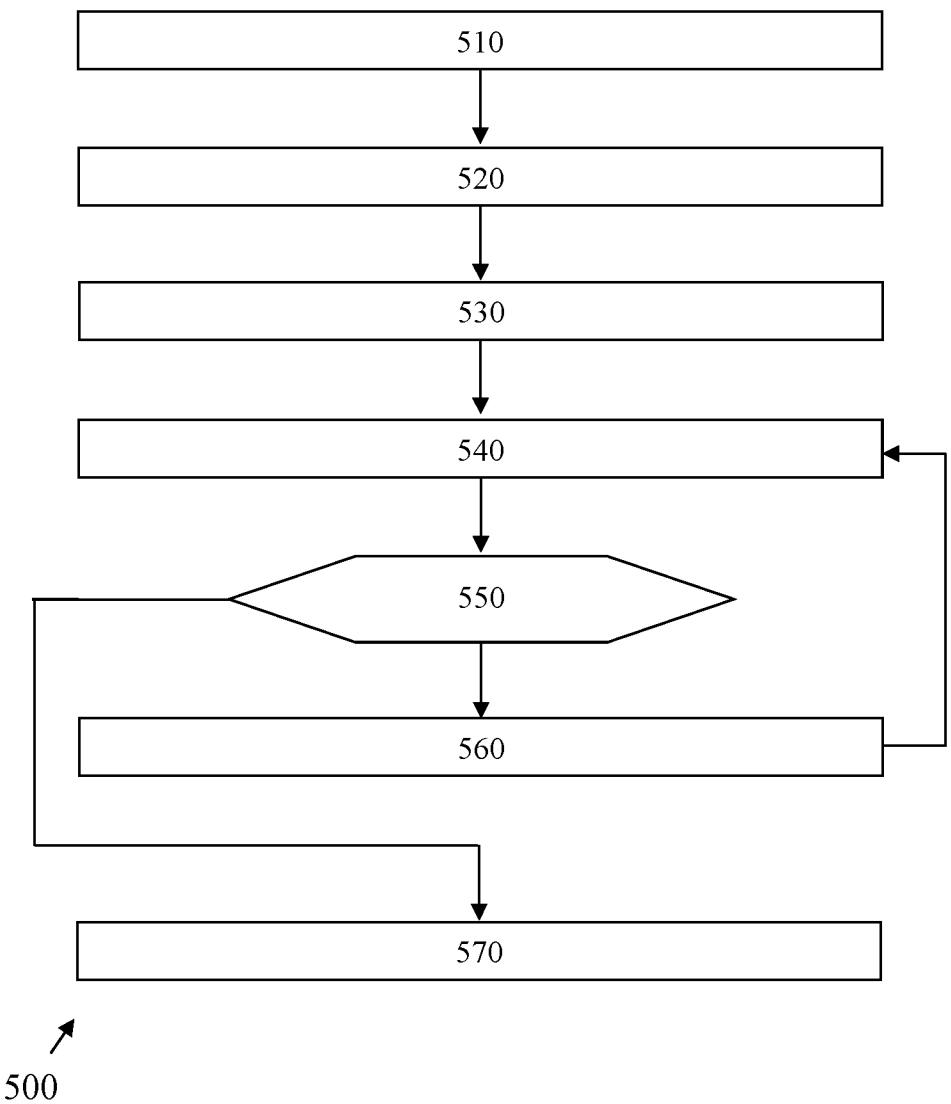
FIG. 5 is a flow chart illustration of a method for manufacturing a vehicle, in accordance with various embodiments.

FIG. 5 illustrates a method 500 for manufacturing a vehicle. The method 500 may include, at action 510, locating two metallic components in a welding station. Further, method 500 includes, at action 520, welding the two metallic components to one another to form an assembly connected with a weld. Further, method 500 includes locating a portable weld defect detector in the welding station at action 530. It is noted that action 530 may be performed before action 520 or before action 510. At action 540, method 500 includes testing the weld with the portable weld-defect detector to detect whether the weld includes a weld defect and/or determine type, dimension and location of the defect. Such testing occurs in the welding station.

Inquiry 550 asks whether the weld includes a weld defect and/or type, dimension and location of the defect. When the weld includes a weld defect, method 500 includes performing an additional welding process to eliminate the weld defect at action 560 according to type, dimension and location of the defect. Thereafter, method 500 continues with further testing of the weld at action 540. When the weld includes no weld defect, method 500 includes removing the assembly from the welding station at action 570.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A weld defect detection method comprising:
    receiving an input indicating a weld material and material thickness by a portable computing device;
    determining, with the portable computing device, a detection protocol for the weld material and material thickness;
    communicating the detection protocol from the portable computing device to a portable heating source and to a portable thermographic sensor;
    heating a weld with the portable heating source according to the detection protocol;
    recording thermographic data from the weld with the portable thermographic sensor according to the detection protocol;
    communicating the thermographic data from the portable thermographic sensor to the portable computing device; and
    analyzing the thermographic data to detect whether the weld includes a defect and/or determine type, dimension and location of the defect.

2. The weld defect detection method of claim 1, wherein the portable computing device analyzes the thermographic data to detect whether the weld includes a defect and/or determine type, dimension and location of the defect.

3. The weld defect detection method of claim 2, wherein the portable computing device includes a memory that stores a library of reference thermographic data, and wherein analyzing the thermographic data to detect whether the weld includes a defect and/or determine type, dimension and location of the defect comprises comparing the thermographic data with the reference thermographic data.

4. The weld defect detection method of claim 3, wherein the portable thermographic sensor is an infrared (IR) sensor, wherein the thermographic data comprises an IR image or IR images or temperature and/or image intensity information obtained from the IR images, wherein the library of reference thermographic data comprises a library of reference IR images or temperature and/or image intensity information obtained from IR images, and wherein each IR image is a temperature distribution image directly received from the IR sensor or is an amplified image using lock-in digital amplification.

5. The weld defect detection method of claim 1, wherein the portable thermographic sensor is an infrared (IR) sensor, wherein the thermographic data comprises an IR image or IR images or temperature and/or image intensity information obtained from the IR images, and wherein the IR image is a temperature distribution image directly received from the IR sensor or is an amplified image using lock-in digital amplification.

6. The weld defect detection method of claim 1, wherein analyzing the thermographic data to detect whether the weld includes a defect comprises performing thermal contour correlation or cooling rate correlation.

7. The weld defect detection method of claim 1, wherein analyzing the thermographic data to detect whether the weld includes a defect comprises performing digital amplification and denoising.

8. The weld defect detection method of claim 1, wherein the portable heating source is a pulsed or continuous long wavelength infrared (IR) light source or laser source or is a heat gun.

9. The weld defect detection method of claim 1, wherein the detection protocol includes a duration for heating the weld with the portable heating source.

10. The weld defect detection method of claim 1, wherein the detection protocol includes a heating position for heating the weld with the portable heating source and a recording position for recording the thermographic data from the weld with the portable thermographic sensor, wherein the heating position can be controlled through a touch-down probe for position adjustment and control, and wherein the touch-down probe can be integrated with the IR sensor.

11. The weld defect detection method of claim 10, further comprising:
    receiving an input indicating the heating position and the recording position with the portable computing device.

12. The weld defect detection method of claim 1, wherein a probe comprises the portable heating source and the portable thermographic sensor.

13. The weld defect detection method of claim 1, further comprising:
    monitoring a distance to the weld from the portable heating source and the portable thermographic sensor with the portable computing device to determine whether a distance adjustment is needed; and
    when the distance adjustment is needed, communicating an instruction to adjust the distance.

14. The weld defect detection method of claim 1, further comprising:
    instructing the portable heating source with the portable computing device to heat the weld according to the detection protocol; and
    instructing the portable thermographic sensor with the portable computing device to record the thermographic data from the weld according to the detection protocol.

15. The weld defect detection method of claim 1, further comprising:
    displaying, on the portable computing device, the weld material and material thickness, the detection protocol, the thermographic data, and/or an indication of whether the weld includes a defect and/or type, dimension and location of the defect.

16. The weld defect detection method of claim 1, further comprising:
locating two metallic components in a welding station;
welding the two metallic components to one another to form an assembly connected with a weld;
locating the portable computing device; the portable heating source and the portable thermographic sensor in the welding station, wherein heating the weld with the portable heating source, recording the thermographic data from the weld, and communicating the thermographic data are performed in the welding station; and
when the weld includes a weld defect and/or determine type, dimension and location of the defect, performing an additional welding process to repair the weld defect according to type, dimension and location of the defect.

17. The weld defect detection method of claim 16, further comprising:
when the weld includes no weld defect, removing the assembly from the welding station.

18. A system for detecting a defect in a weld, the system comprising:
a portable heating source;
a portable thermographic sensor;
a portable computing device in communication with the portable heating source and the portable thermographic sensor, wherein the portable computing device is configured to execute an application in response to receiving an input, the application comprising computer-executable instructions that, when executed by the portable computing device, are configured to:
determine a detection protocol for a weld material and material thickness;
communicate the detection protocol to a portable heating source and to a portable thermographic sensor;
receive thermographic data from the portable thermographic sensor; and
analyze the thermographic data to detect whether the weld includes a defect and/or determine type, dimension and location of the defect;
wherein the portable heating source is configured to heat the weld according to the detection protocol; and
wherein the portable thermographic sensor is configured to record the thermographic data from the weld according to the detection protocol.

\* \* \* \* \*